Nov. 24, 1959     A. W. HEDGREN     2,913,779
WINDOW AND LIKE STRUCTURES
Filed April 29, 1957
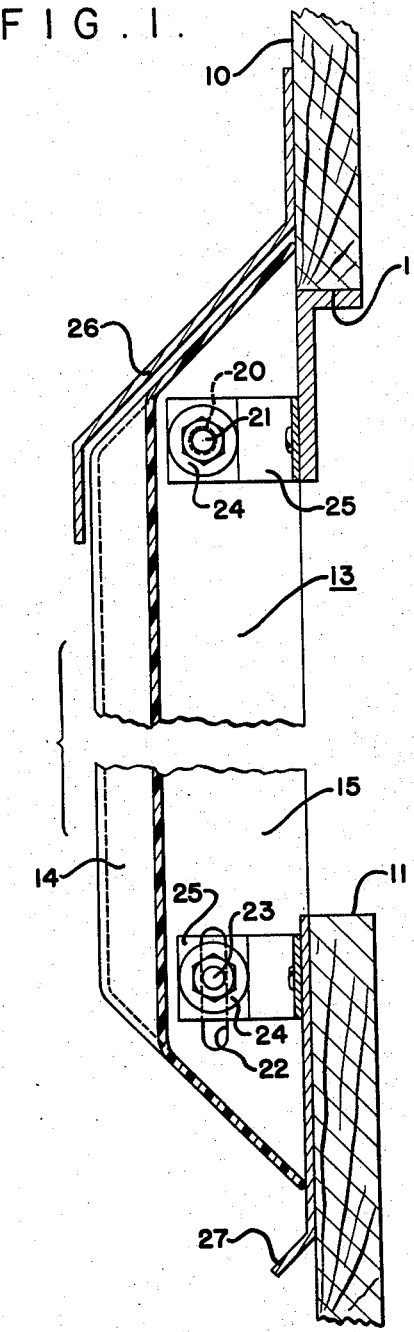
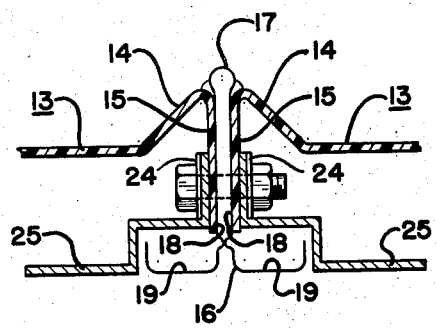
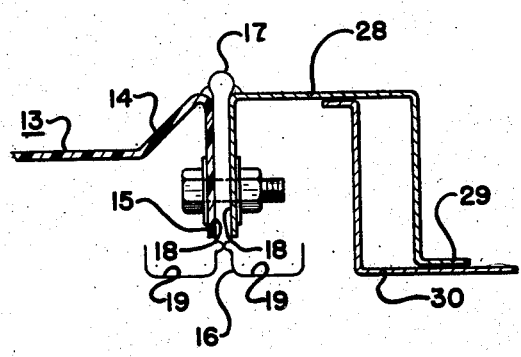
INVENTOR
ARTHUR W. HEDGREN

2,913,779
WINDOW AND LIKE STRUCTURES
Arthur W. Hedgren, Pittsburgh, Pa.

Application April 29, 1957, Serial No. 655,616

5 Claims. (Cl. 20—40)

This invention relates to window and like structures and particularly to plastic resin windows and sky lights.

Glass fibered reinforced plastics that transmit light have distinct advantages in building construction, particularly as windows and sky lights. Among the advantages are ease of fabrication, light weight, resistance to handling and inexpensiveness. Glass fibered reinforced plastics have, however, not been used in many applications because of their high coefficient of expansion and contraction and instability to ordinary building loads which create serious maintenance problems. These disadvantages are particularly apparent when glass fibered reinforced plastics are used as windows and sky lights in building construction.

The present invention provides a solution to the disadvantages which are outlined above and which have heretofore prevented the complete utilization of glass fibered reinforced plastics as windows and sky lights in building construction. The invention provides a unique assembly to compensate for expansion and contraction in all directions and to provide structural strength for both operating and fixed installation of windows and sky lights.

I provide a window panel having a flat plane transmitting sheet bounded by downwardly bent transverse flanges. A structural rib of resilient material adapted to fit between adjacent flanges is provided. The rib is preferably in the form of an expansible and compressible member having a circular bead portion along one side abutting and preferably overlapping the edges of the light transmitting panels. The opposite side is provided with gutters running lengthwise of the rib on opposite sides thereof beneath the edges of the flanges whereby condensation dripping from the flanges is carried away from the windows. Each rib is provided with at least one indexing hole and spaced slotted bolting holes corresponding to holes in the flanges of the light transmitting member. Bolts are passed through these holes in order to fasten adjacent panels together and to the rib. Preferably, each of the light transmitting panels is provided with a raised rib adjacent the flange on the outside of the panel for the purpose of diverting rain or snow away from the joint as well as for architectural appearance, said rib fitting beneath the bead of the rib. The head and the jambs of the windows are flashed in conventional manner. The sill flashing is arranged to permit the bottom of the window to move in expansion and contraction.

While a preferred form of this invention has been generally described hereinabove, other forms, objects, purposes and advantages of this invention will be apparent from a consideration of the following description and the accompanying drawings in which Figure 1 is a section through a building incorporating a window according to the invention, parts being broken away;

Figure 2 is a section throughout a vertical rib between adjacent light transmitting panels; and Figure 3 is a section through a side and end flashing adapted for use with the present invention.

Referring to the drawings, I have illustrated a side wall 10 having an opening 11 to which a window structure according to the present invention is attached. A plurality of glass reinforced plastic panels 13 having a raised rib 14 and a depending flange 15 along each edge are assembled with an expansible metal rib 16 between each adjacent flange 15. Each rib is formed with a round head portion 17 and two depending legs 18 in hairpin form. The legs are jointed adjacent the ends and flare out away from one another to form gutter 19. Each of the adjacent panels is provided with a fixed hole 20 at one end receiving a bolt 21 to hold the panels and ribs together. Spaced from the fixed hole 20 are slotted openings 22 along the length of the rib 16 and the flanges 15 on the light transmitting panels. Each of the slotted openings is provided with a bolt 23 and washers 24 which prevent the bolt from passing through the slotted opening. Metal clips 25, preferably of stainless steel, are fastened to the bolt 23 and to the structural body of the building.

The metal rib 16 is preferably made of stainless steel but may be made of any similar resilient, tough material.

A conventional overlapping flashing 26 is used at the top of the window assembly (see Figure 1) and along the sides. At the bottom of the assembly a sill flashing 27 underlies the window assembly which is free to move on the sill thereby permitting freedom of expansion with changing temperatures.

In Figure 3 there is illustrated an alternative form of sliding contact sill adapted for use as the lower sill of a structure such as shown in Figures 1 and 2 or as the edge flashing for a skylight. In the structure of Fig. 3 the flange 15 is connected through a rib 16 to a flashing member 28 in the form of an inverted U having a bearing flange 29 on one leg of the U. A cooperating flashing member 30 of Z shape is fixed to the building frame with the bearing flange 29 on the leg of the Z flashing member 30. Expansion and contraction causes the bearing flange 29 to adjust itself on the flange 30.

The construction described herein above may be used in fixed position in a window opening or it may be used in conjunction with operating units of conventional style (not shown). The windows may be installed on vertical or horizontal surfaces or any degree of slope therebetween and in short or long runs.

While I have illustrated and described certain preferred embodiments of my invention hereinabove, it will be understood that the invention may be otherwise embodied within the scope of the following claims.

I claim:

1. A window structure comprising at least two substantially identical side by side light transmitting panels having a plane surface with depending flanges along each edge, a resilient member adapted for compression and expansion between the adjacent edges of said two panels, a fixed fastening member connecting the panels and the resilient member at one point along the length thereof, said flanges and resilient member having cooperating elongated slots spaced along the length thereof and spaced fastening members in said slots slidably engaging the resilient member and panels to form a unitary whole capable of movement on the spaced fastening members relative to the fixed fastening members.

2. A window structure comprising at least two substantially identical side by side light transmitting panels having a plane surface with depending flanges along each side, a resilient member having spaced sidewalls adapted to be variably spaced with respect to one another between adjacent depending flanges, a bead on one end of said sidewalls overlying the adjacent edges of the panels, the other ends of said sidewalls being flared away from each other to form gutters lying beneath the depending flanges of the panels, a fixed fastening member connecting the panels and the sidewalls of the resilient member at one point along the length thereof, said flanges and resilient member having cooperating elongated slots spaced along the length thereof and spaced fastening members in said slots slidably engaging the sidewalls and panels to form a unitary whole.

3. A window structure comprising at least two side by side light transmitting panels having a generally plane surface with depending flanges along each side, a resilient member having spaced sidewalls adapted to be variably spaced with respect to one another between each pair of adjacent depending flanges, a bead on one end of said sidewalls overlying the adjacent edges of the panels, the other ends of said sidewalls being flared away from each other to form gutters lying beneath the depending flanges of the panels, a fixed fastening member connecting the panels through the sidewalls of the resilient member, spaced fastening members slidably connecting the panels through the sidewalls of the resilient members to form a unit, a resilient member along each outside flange of the unit, a U-shaped member fixed at one leg to said resilient member and a Z-shaped flashing member fixed to the edge of a window opening and adapted to slidably fit within the U-shaped member to form a slidable weatherproof seal about the window.

4. A window structure comprising a surface having a window opening, a flange extending transverse to the plane of the surface adjacent the edges of said window opening, a plurality of panels having a generally plane surface with depending flanges along each edge adapted to fit together to form a unit, a resilient member having spaced sidewalls adapted to be variably spaced with respect to one another between each pair of depending flanges, cap means on one edge of said sidewalls overhanging the sidewalls whereby to overlie the adjacent edges of the panels, sidewardly extending gutter means on the opposite edges underlying the depending flanges of the panels, fastener means connecting the flanges through the sidewalls of the resilient member, said fastener means being relatively movable with respect to said flanges and resilient means, like resilient means along each external flange of the unit and U-shaped sealing means movably surrounding the surface opening flange and fiixed at one leg to the external panel flanges through the sidewalls of the resilient means.

5. A sealing device comprising side by side flanges, a pair of spaced resilient sidewalls adapted to be variably spaced with respect to one another, an arcuate bead connecting said sidewalls at one end thereof and overlying the planes of the sidewalls and the plane of the side by side flanges, transversely extending members on the opposite end of each of said sidewalls extending away from the sidewalls, said members being upturned along the edges thereof to form gutters lying beneath said resilient sidewalls and the side by side flanges and slotted openings in said sidewalls receiving fastening means through the flanges.

References Cited in the file of this patent
UNITED STATES PATENTS

| | | |
|---|---|---|
| 816,807 | Mellowes | Apr. 3, 1906 |
| 1,035,509 | Yauch | Aug. 13, 1912 |
| 2,446,323 | Davis et al. | Aug. 3, 1948 |
| 2,572,947 | Pevney | Oct. 30, 1951 |
| 2,693,156 | Wasserman | Nov. 2, 1954 |
| 2,773,289 | Martin et al. | Dec. 11, 1956 |
| 2,790,400 | Wasserman | Apr. 30, 1957 |

FOREIGN PATENTS

| | | |
|---|---|---|
| 583,242 | Great Britain | Dec. 12, 1946 |
| 699,355 | Great Britain | Nov. 4, 1953 |